April 26, 1960  A. H. CARLSON ET AL  2,934,333
MEANS FOR STABILIZING RAILWAY TRUCKS
Filed Feb. 10, 1955  12 Sheets-Sheet 1

Inventor
Arthur H. Carlson
and Cal W. Wulff
By Mann, Brown and Hansmann
Attys.

April 26, 1960  A. H. CARLSON ET AL  2,934,333
MEANS FOR STABILIZING RAILWAY TRUCKS
Filed Feb. 10, 1955  12 Sheets-Sheet 2

Inventors
Arthur H. Carlson
and Cal W. Wulff
By Mann, Brown and Hansmann
Attys.

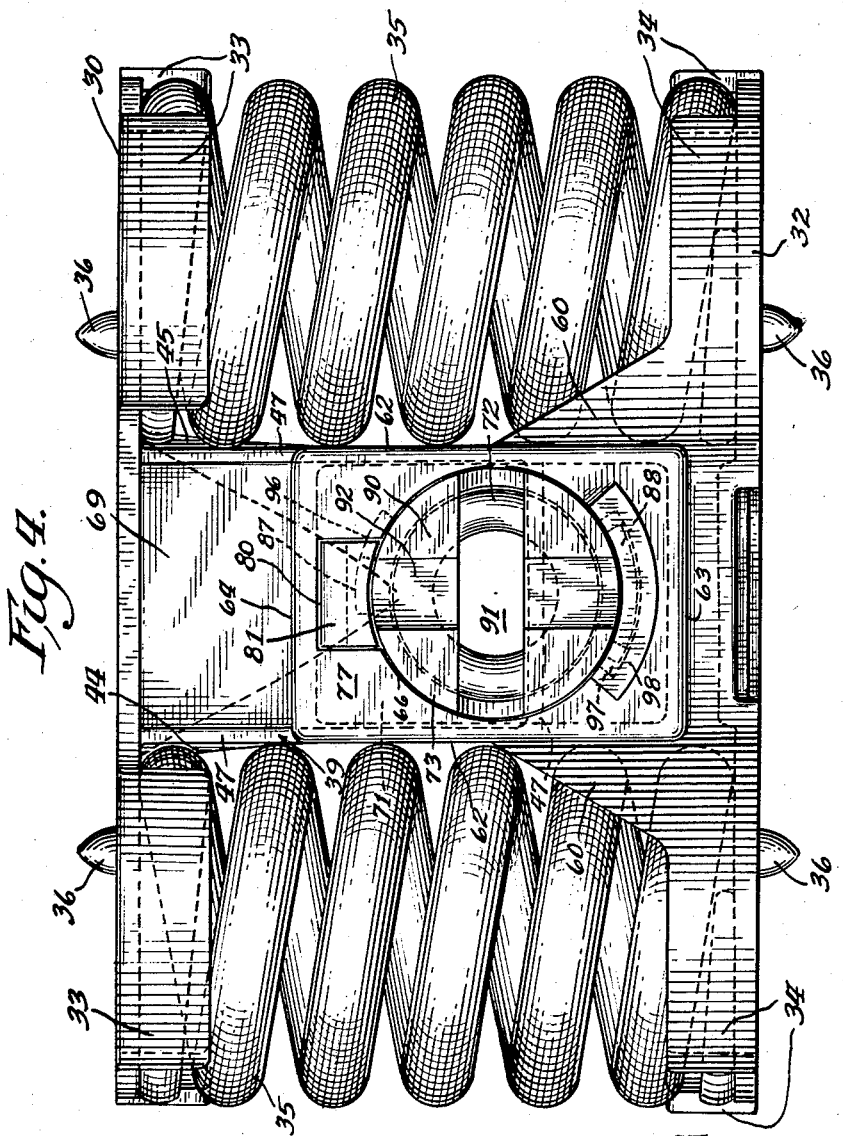

April 26, 1960 A. H. CARLSON ET AL 2,934,333
MEANS FOR STABILIZING RAILWAY TRUCKS
Filed Feb. 10, 1955 12 Sheets-Sheet 4
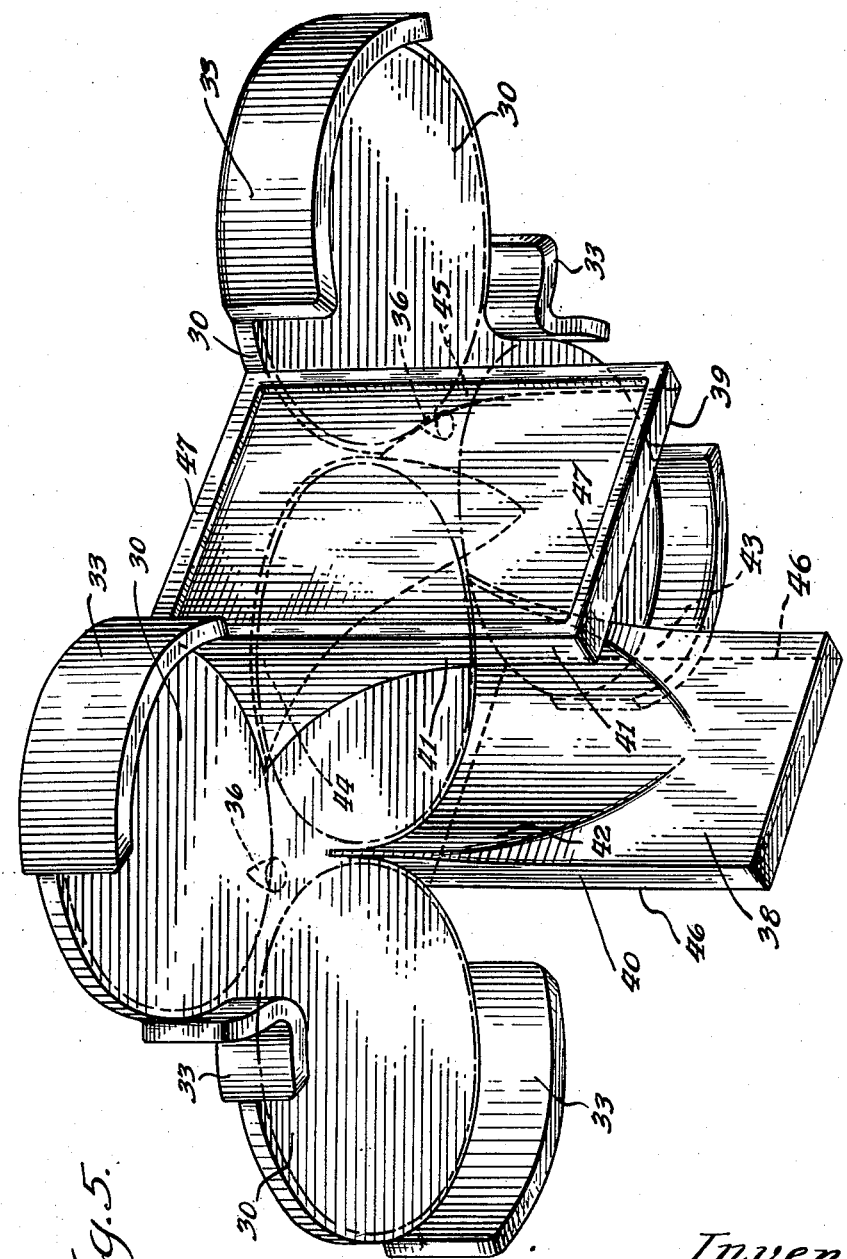
Inventors
Arthur H. Carlson
and Cal W. Wulff
By Mann, Brown and Hanemann,
Attys April 26, 1960   A. H. CARLSON ET AL   2,934,333
MEANS FOR STABILIZING RAILWAY TRUCKS
Filed Feb. 10, 1955   12 Sheets-Sheet 5

Inventors
Arthur H Carlson
and Cal W. Wulff
By Mann, Brown and Hansmann
Attys.

April 26, 1960 — A. H. CARLSON ET AL — 2,934,333
MEANS FOR STABILIZING RAILWAY TRUCKS
Filed Feb. 10, 1955 — 12 Sheets-Sheet 6
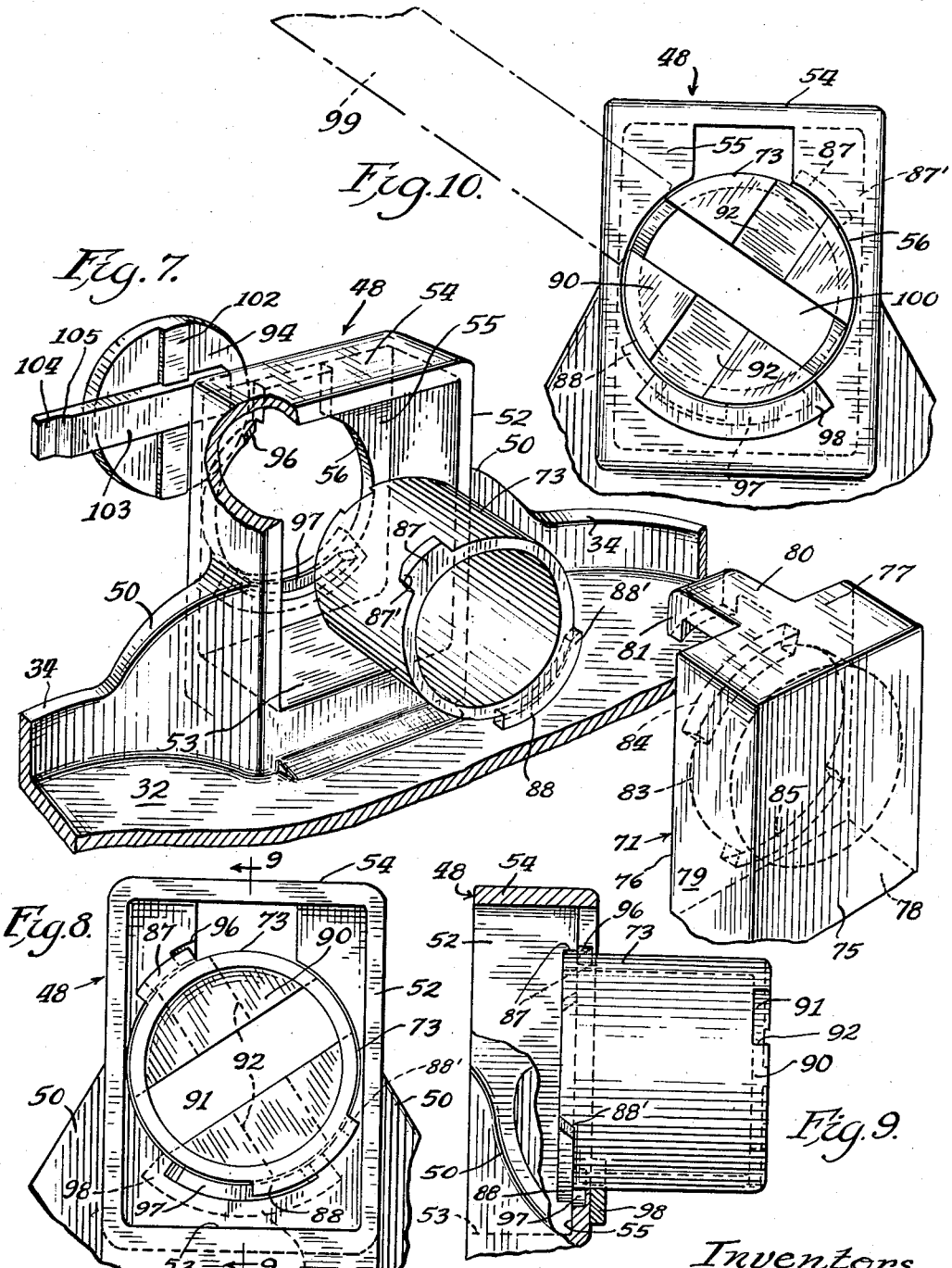
Inventors
Arthur H. Carlson
and Cal W. Wulff
By Mann, Brown and Hansmann
Attys

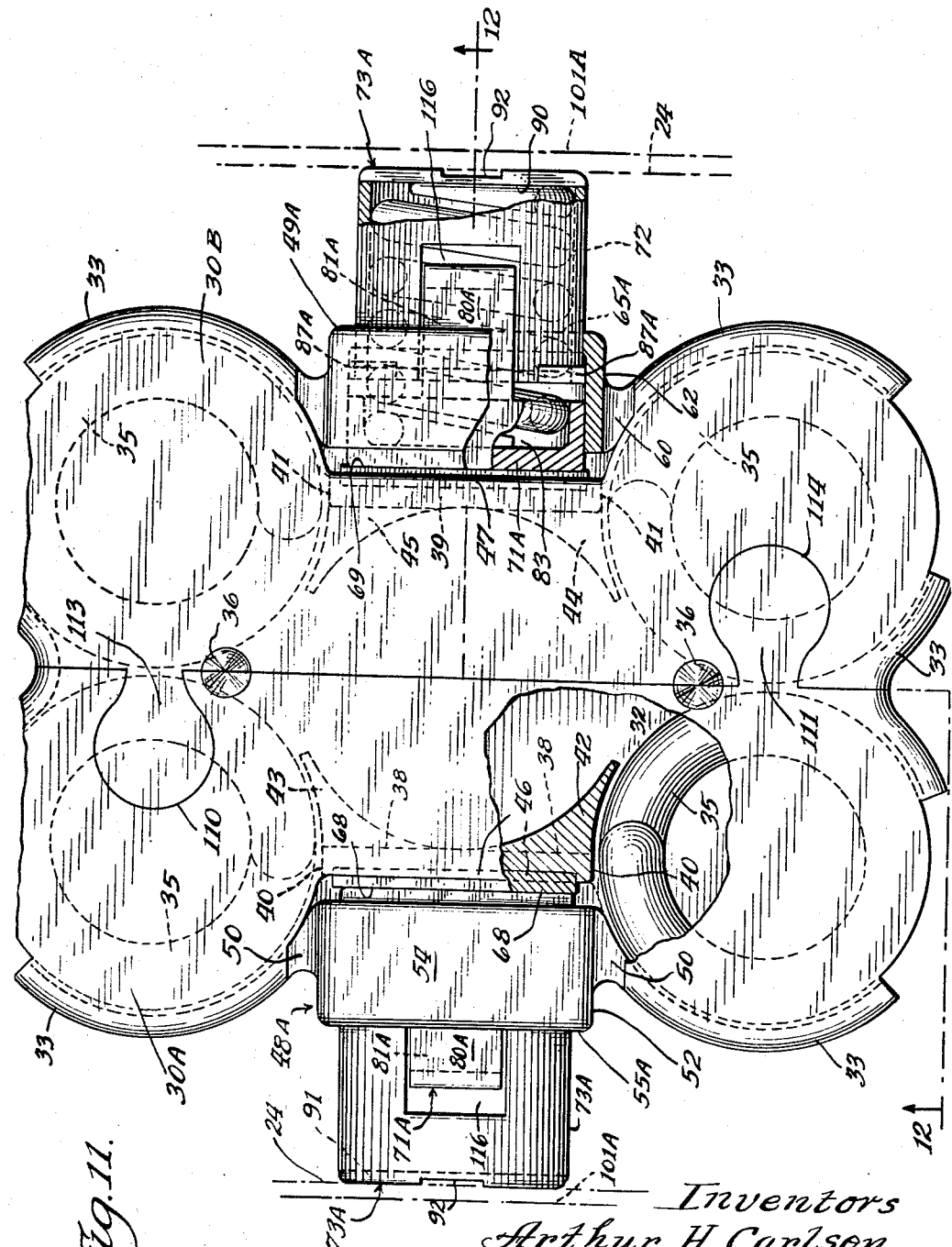

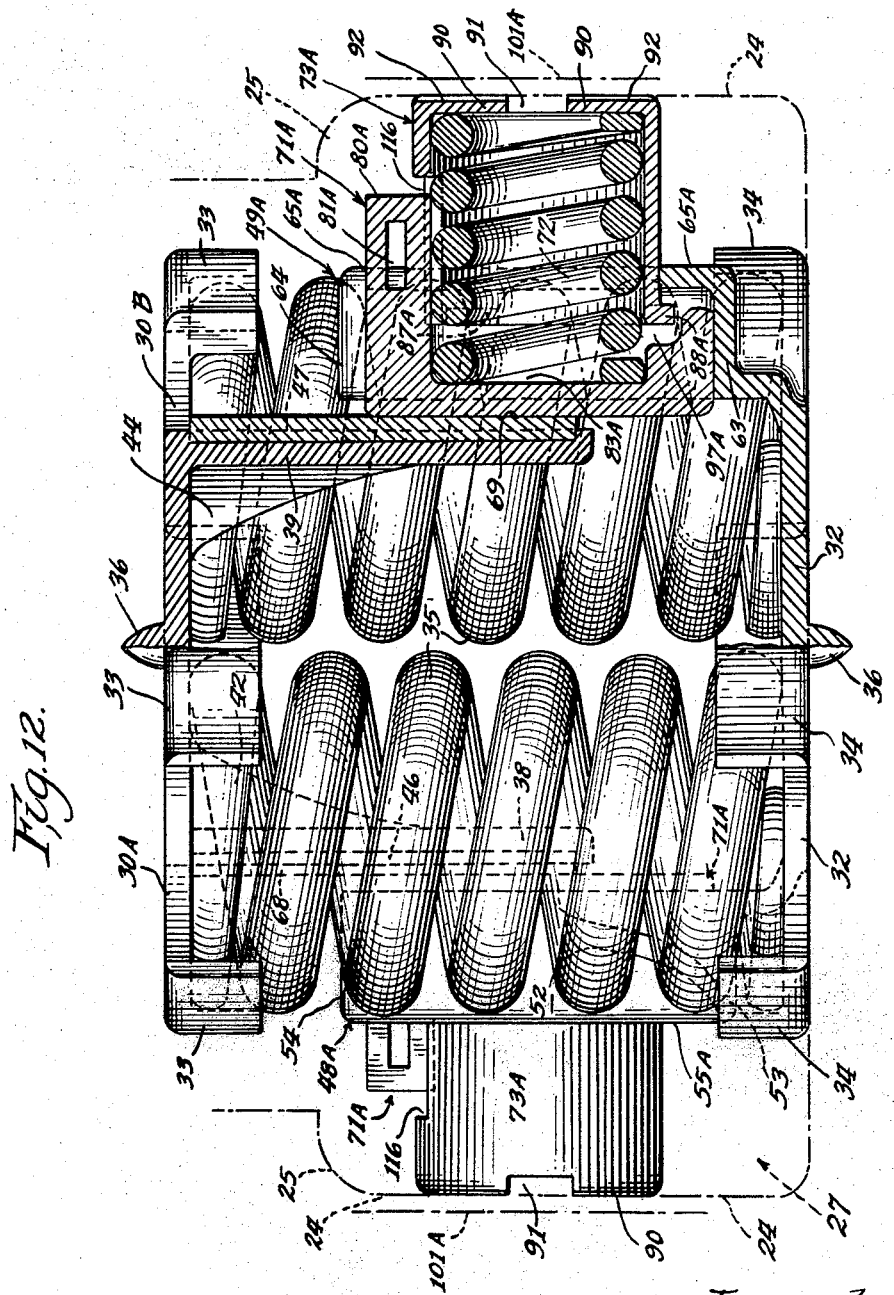

April 26, 1960   A. H. CARLSON ET AL   2,934,333
MEANS FOR STABILIZING RAILWAY TRUCKS
Filed Feb. 10, 1955   12 Sheets-Sheet 9
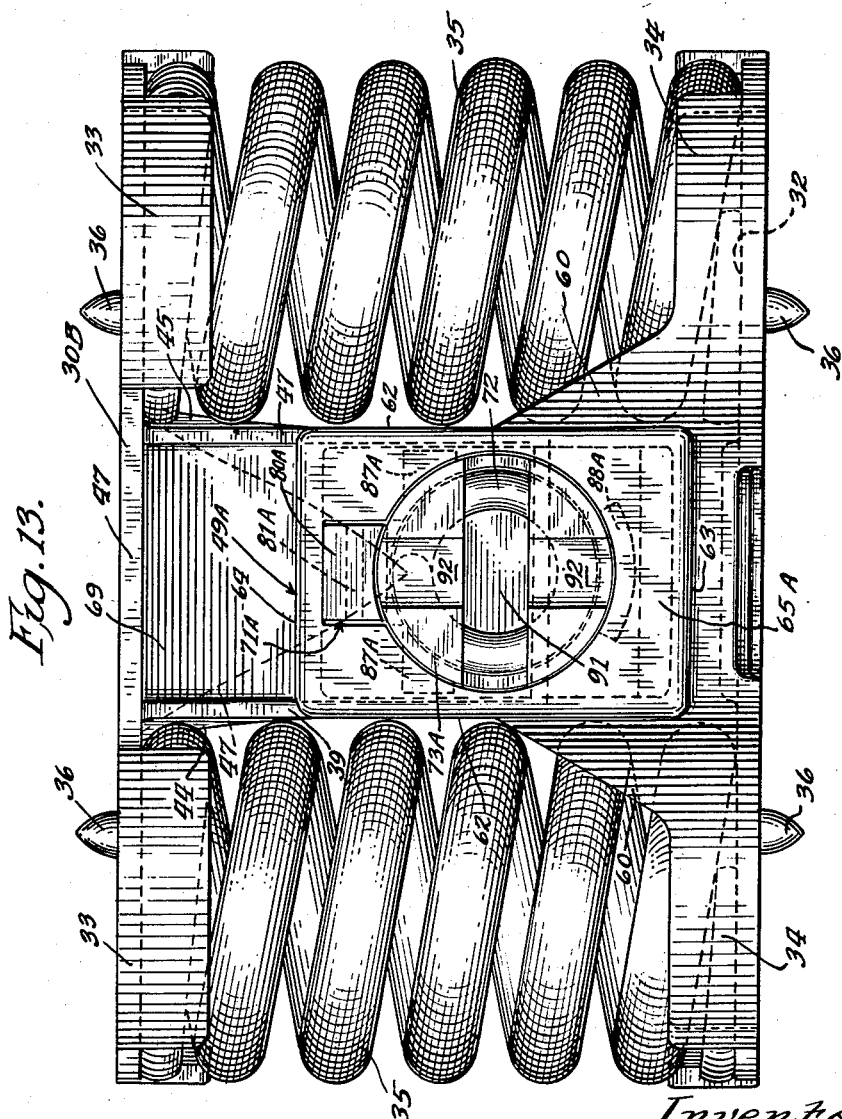
Inventors
Arthur H. Carlson
and Cal W. Wulff
By Mann, Brown and Hanemann.
Attys.

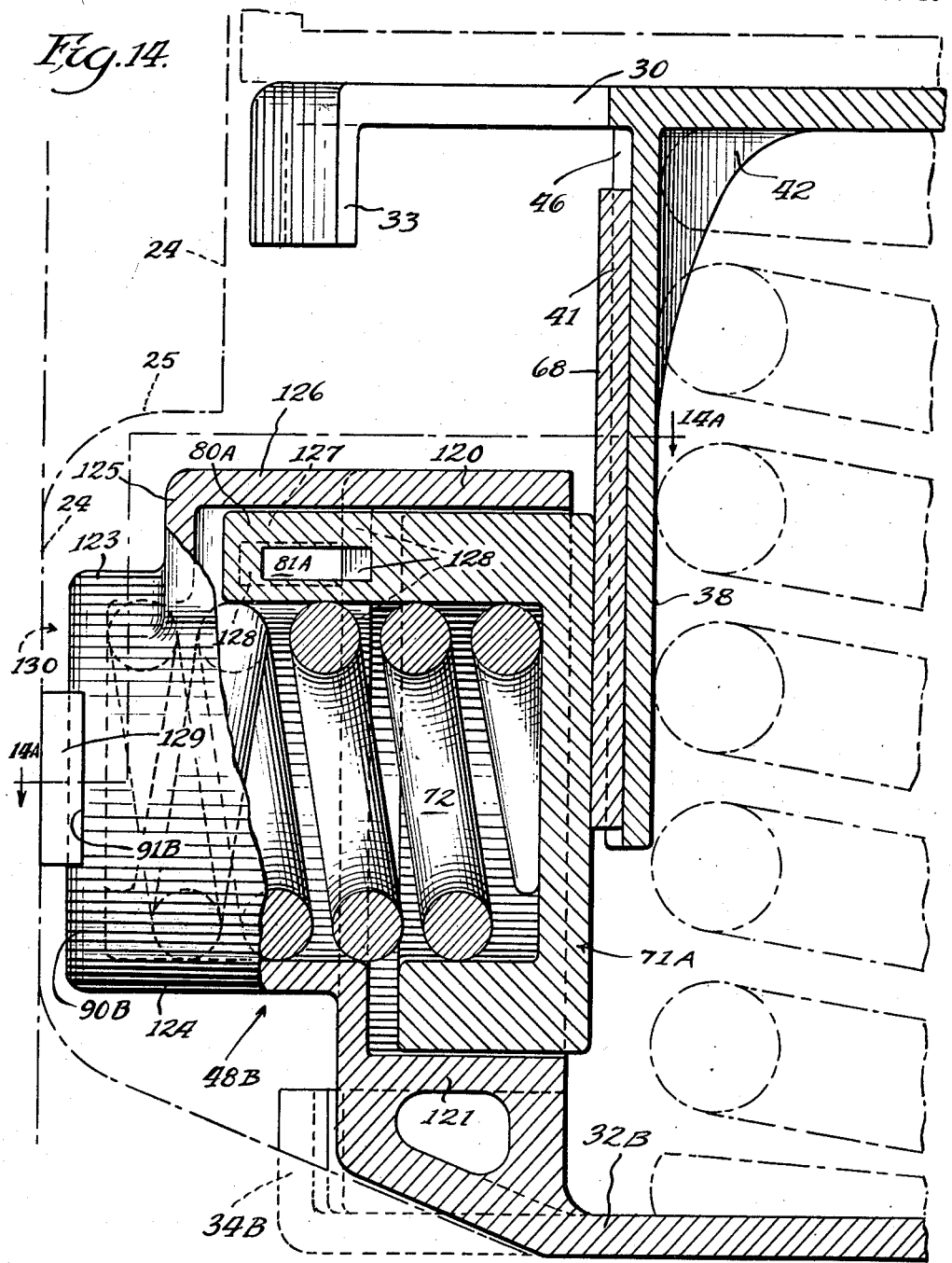

April 26, 1960     A. H. CARLSON ET AL     2,934,333
MEANS FOR STABILIZING RAILWAY TRUCKS
Filed Feb. 10, 1955
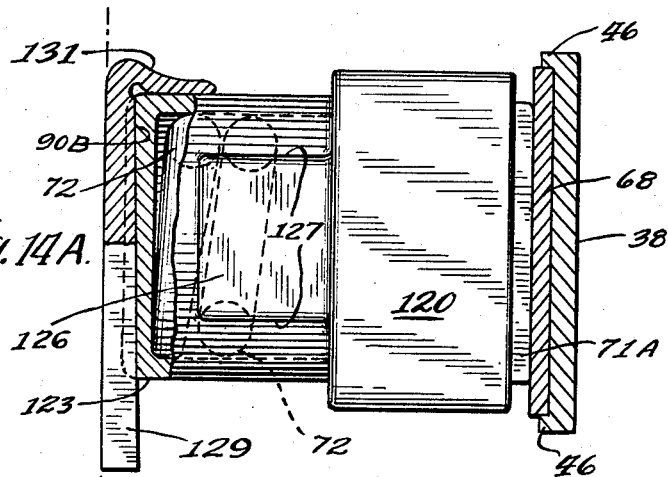
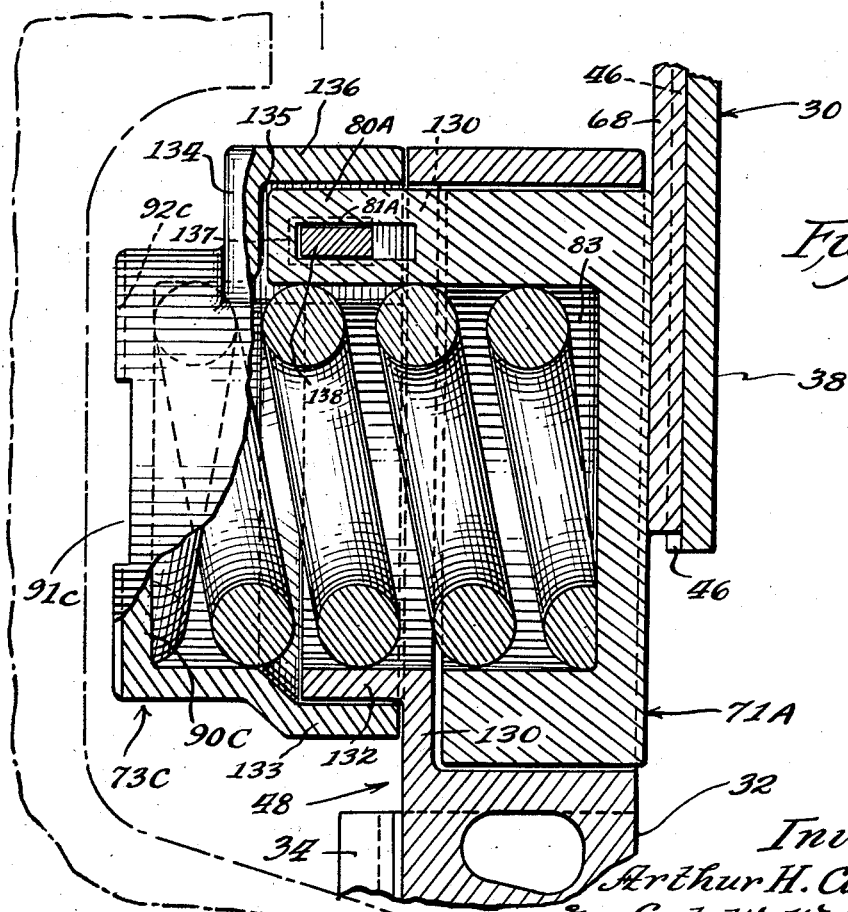
Inventor
Arthur H. Carlson
Cal W. Wulff
By Mann, Brown and Hansmann
Attys.

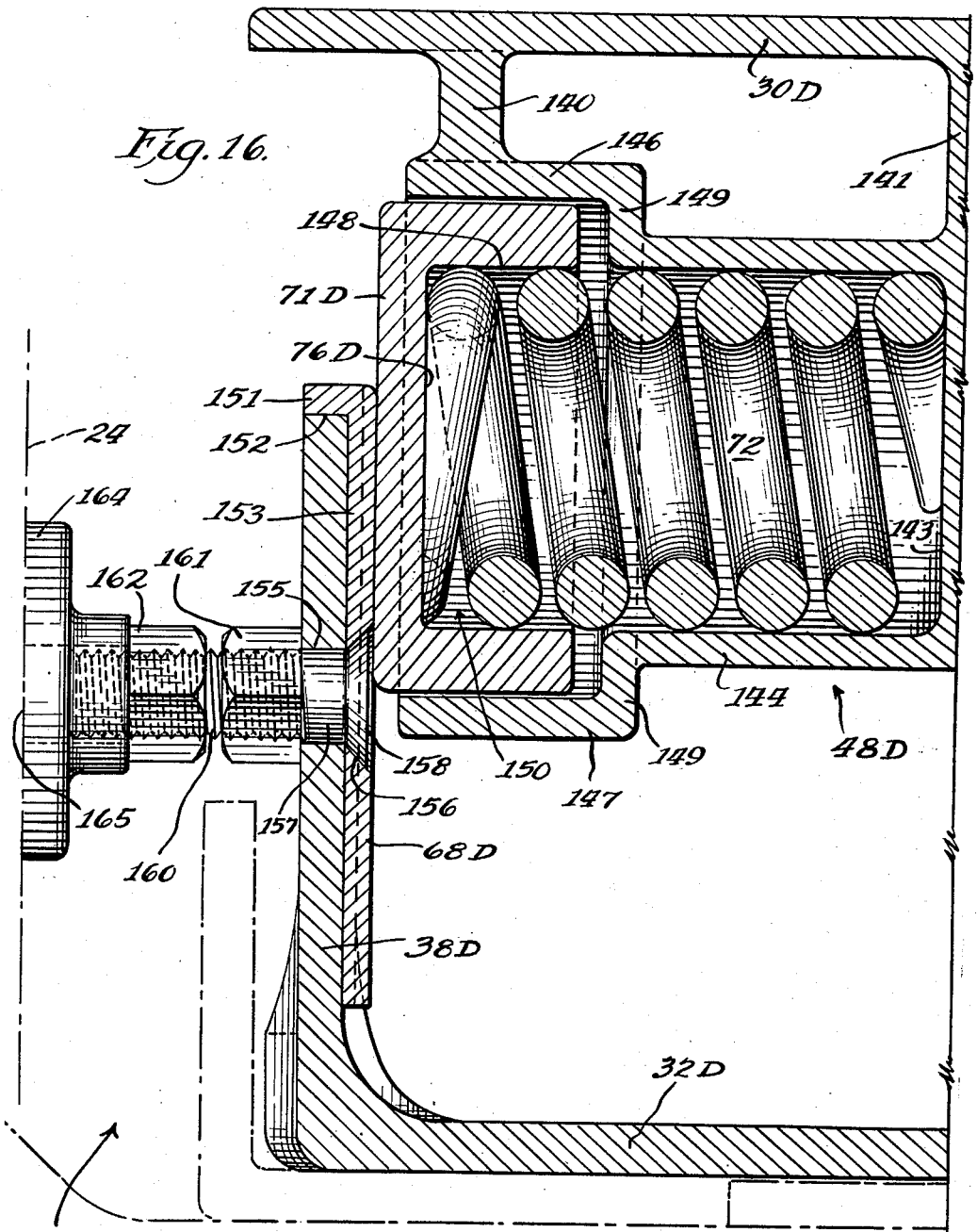

United States Patent Office 2,934,333
Patented Apr. 26, 1960

2,934,333
MEANS FOR STABILIZING RAILWAY TRUCKS

Arthur H. Carlson, Three Oaks, Mich., and Cal W. Wulff, Elmhurst, Ill., assignors to Holland Co., Chicago, Ill.

Application February 10, 1955, Serial No. 487,318

9 Claims. (Cl. 267—9)

This invention relates to a device for stabilizing railway car trucks and seeks to improve the riding qualities of railway cars by damping spring vibrations such as are caused by irregularities in the track and by opposing the tendency of the truck to get out of square on curves in the track. The present device takes the form of a spring package and is adapted for use on existing railway car trucks.

Many previous spring package units have been devised and employed towards this end, but in most such known types, both of the package members are subjected to the constant strain created by the stabilizing system of the package. This inherent weakness in the prior devices has long been recognized, but until this time no satisfactory solution has been offered. In addition, many known spring packages employ springs of substandard size that afford less capacity, and being of special design are difficult to replace from the usual inventory of springs maintained by the railroads of this country.

In certain package units, box shaped followers that are adapted to nest one within the other are employed, and it has been seen that devices incorporating this general arrangement are unduly subject to failure due to heavy lateral shock loads and/or pronounced lateral rolls that are so frequently encountered under actual operating conditions.

To provide a ride stabilizing means of sturdy and reliable construction that overcomes these deficiencies of the prior art devices is the principal object of the present invention. Accordingly, it is proposed to provide a package unit: that removes the control spring pressure from one of the package members; that eliminates nesting of the top control portion of the package into the bottom control portion of the package; that permits the use of standard A.A.R. springs and thereby provides for additional spring group capacity; that overcomes longitudinal shifting of the package in the truck side; that provides a balanced, uniform friction for all loads on both compression and release and eliminates friction shoe "bombarding"; that provides a method for shimming up the friction system to compensate for reductions in the stabilizing effect due to metal loss on the friction blocks caused by wear; that serves in maintaining truck squareness; and that may be furnished either as a complete unit or as a parts assembly to which the user adds the necessary bolster supporting springs.

Generally this is accomplished by loading the friction blocks through a stabilizing system that is biased against the vertical side frame columns that straddle the bolster and stabilizing unit. In the preferred form, the control spring cylinders are made separate from and freely movable relative to the friction shoe housings formed on the lower spring plate, and the cylinders themselves abut against the vertical faces of the side frame columns. In another of the proposed forms, the spring housing is integral with one of the spring plates and separate compression members transmit the loads of the control springs to the opposed vertical faces of the side frame column, thereby relieving one of the spring plates of the constant strain created by the stabilizing system of the package, and in effect causes this member to become an integral part of the side frame. Because the stabilizing system acts against the opposed vertical faces of the side frame columns, it is an inherent advantage of the present arrangements that the control springs tend to oppose any tendency of the bolster to shift longitudinally relative to the truck.

The stabilizing units disclosed herein are characterized by axially loaded friction blocks having flat friction faces that are free of any wedge action and the system is adapted to provide a constant stabilizing friction force on both the compression and release motion of the bolster springs. The term "axially loaded," as used in the specification and claims, is intended to mean that the axis of the control spring is normal to the plane of the flat friction surfaces of the friction block. In addition, the friction force is independent of the magnitude of the loads imposed upon the bolster. The use of axially loaded friction faces renders the novel friction system free of friction block "sticking" and "bombarding" that so frequently contributes to the failure of the parts under bombardment.

One of the spring plates is formed with a pair of opposed friction end walls spaced longitudinally of each other, and the other spring plate supports longitudinally spaced housings for a pair of oppositely directed control springs that urge a pair of flat-faced friction blocks into engagement with the respective end walls. Thus the spring plates are free to move laterally relative to one another since the present arrangement eliminates the nesting of one of the members within the other.

The present device exerts a three-way control of the bolster movement; that is, the vertical, lateral, and longitudinal movements of the bolster are all controlled by the stabilizing unit of the present invention.

Other objects and advantages of the invention will be apparent during the course of the following description.

In the accompanying drawings forming a part of this specification and in which like numerals are employed to designate like parts throughout the same, Fig. 1 is a side elevation of a portion of a conventional truck including a ride stabilizing unit in accordance with the present invention;

Fig. 3 is an elevational view partly in section taken along the line 3—3 of Fig. 2;

Fig. 4 is an elevational view taken at right angles to the view of Fig. 3;

Fig. 5 is a perspective view of the upper spring plate in accordance with the preferred form of the present invention;

Fig. 7 is an exploded perspective view illustrating the relationship of some parts of the friction system of the preferred form;

Fig. 8 is an inside view of a friction housing in accordance with the preferred form;

Fig. 9 is a side elevational view of the friction housing of Fig. 8 with portions broken away;

Fig. 10 is an external view of the friction housing of Fig. 8 illustrating the application of a lever bar used in installing the ride stabilizing unit in a conventional truck;

Fig. 11 is a plan view of a modified form of ride stabilizer unit in accordance with the present invention with parts broken away;

Fig. 12 is an elevational view partly in section taken along the line 12—12 of Fig. 11;

Fig. 13 is an elevational view taken at right angles to the view of Fig. 12;

Fig. 14 is a fragmentary elevational view of another modified form of the present invention;

Fig. 14A is a view taken along the line 14A—14A of Fig. 14;

Fig. 15 is a view similar to that of Fig. 14 illustrating still another form of the present invention; and Fig. 16 is a similar view of a further modified form.

Figure 1:
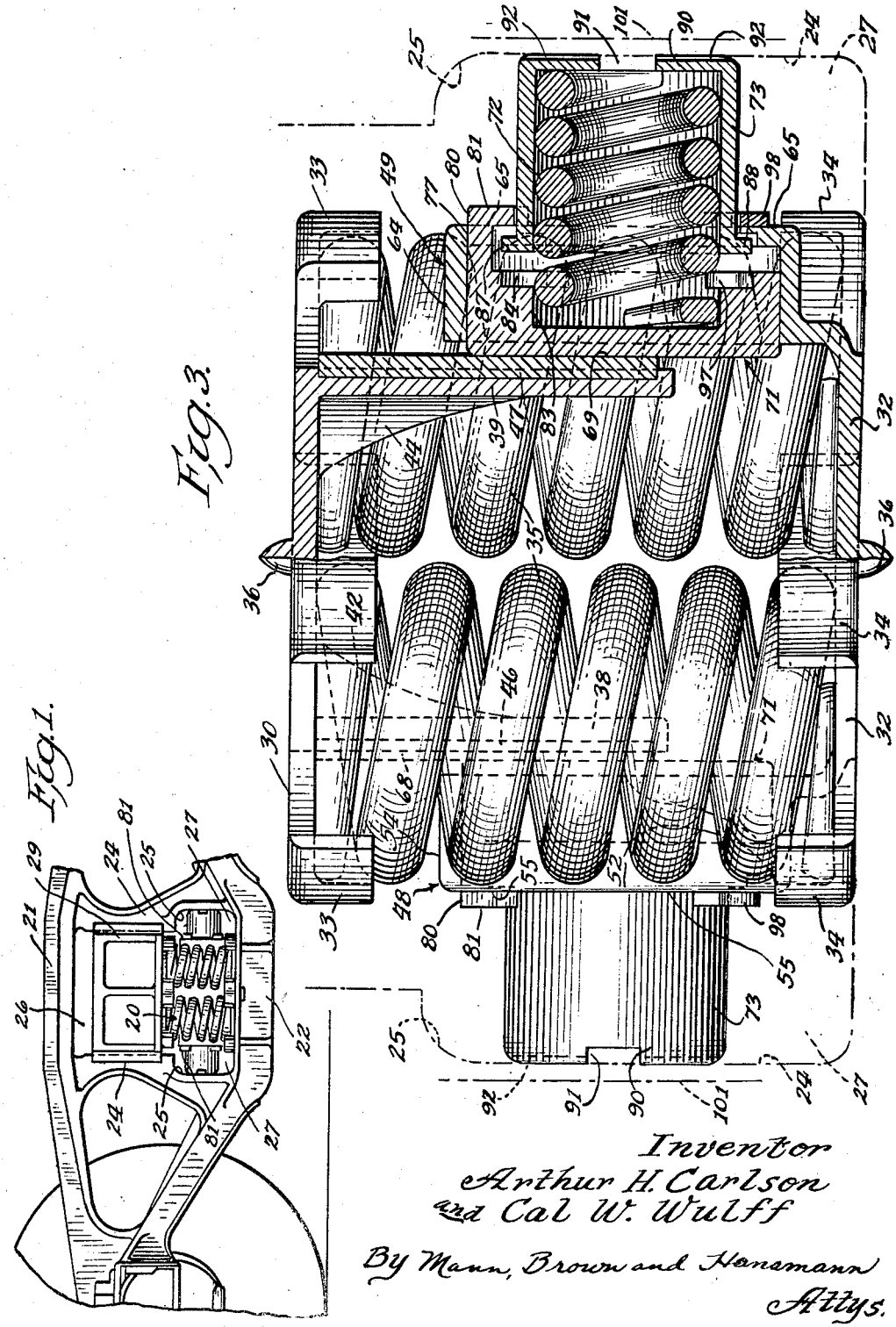

Referring to Fig. 1, the ride stabilizing unit, designated generally at 20, is shown mounted in the side frame of a conventional truck, which term is here intended to mean any type of truck that does not include built-in stabilization. The side frame includes a compression member 21, a tension member 22, and the spaced side columns 24 that are stepped, as at 25, in the usual manner to define an upper bolster window 26 that flares outwardly to merge with a lower spring window 27. The package unit 20 replaces the conventional bolster spring arrangements and accordingly is mounted in the lower window 27 to support one end of a bolster 29.

Figure 6:
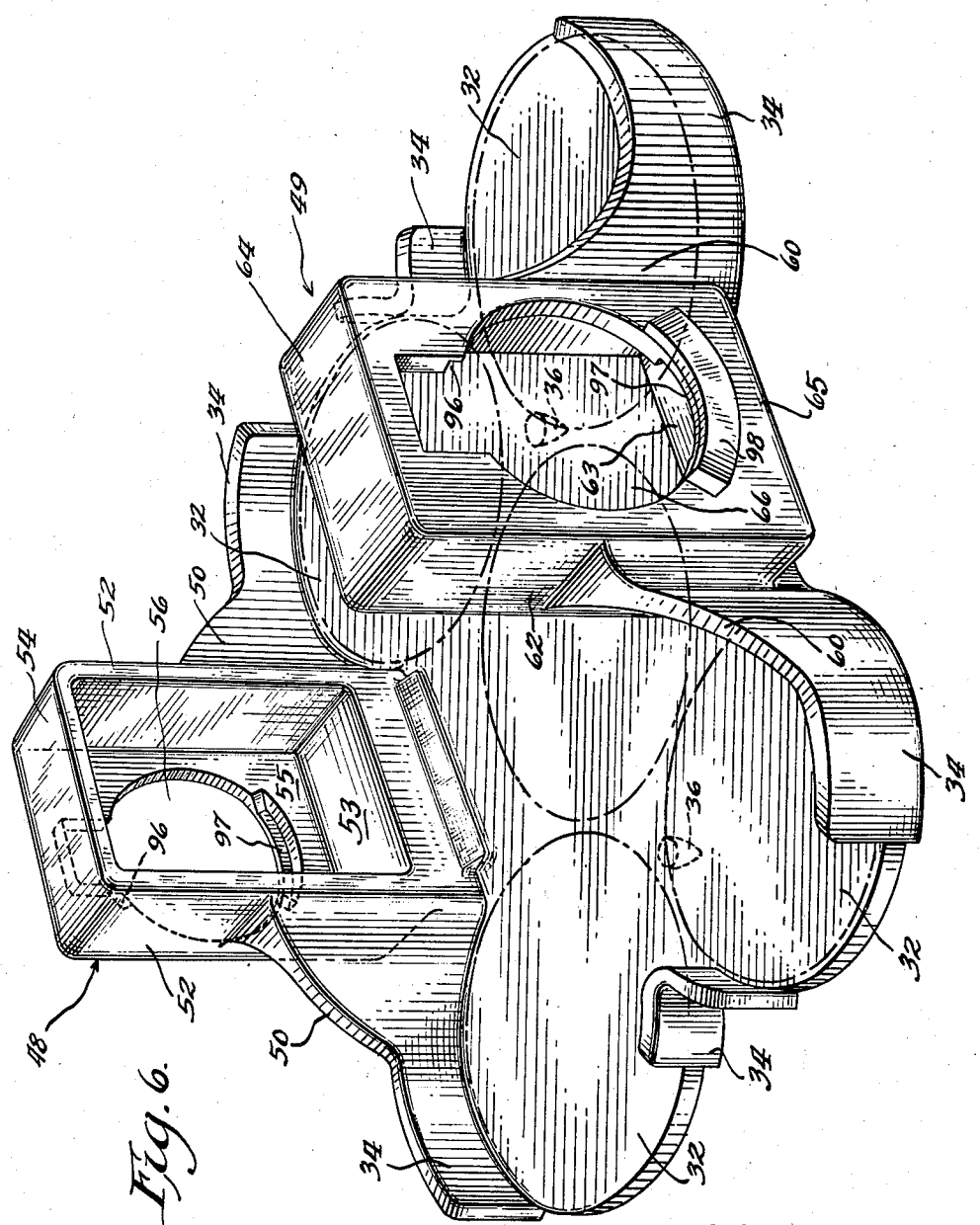
Fig. 6 is a perspective view of the lower spring plate in accordance with the preferred form.

The preferred form of the present invention, as shown in Figs. 2 to 10, includes an upper spring plate or spring cap 30 and a lower spring plate or spring seat 32. The spring cap is formed with downwardly projecting peripheral flange portions 33 and the spring plate is formed with similar upwardly projecting peripheral flange portions 34. The flanges 33 and 34 cooperate with a set of four springs 35 of familiar form, such as A.A.R. standard recommended practice, and are effective to properly seat these outer springs and maintain them in proper relationship. The arrangement of the present device accommodates standard size springs and hence provides increased spring group capacity. This is an important operating advantag over similar type devices which employ bolster springs of substandard size. In addition, these flanges, as best seen in Figs. 5 and 6, are preferably discontinuous to facilitate drainage and similar such problems of maintaining the unit free of foreign material.

The cap and seat are each formed with a pair of outward projections 36 that cooperate with openings formed in the bolster 29 and spring plank (not shown), if used, to prevent relative sliding movement between the stabilizing unit and its supported and supporting truck frame portions.

The top plate includes a pair of opposed, depending vertical end walls 38 and 39 that are prefereably formed integral with the plate and are spaced apart an appropriate distance longitudinally from each other to define a central spring chamber. Each end wall is provided with a pair of internal reinforcing ribs adjacent their vertical side edges, designated 40 and 41, respectively. The wall 38 is strengthened by ribs 42 and 43, and the wall 39 is strengthened by ribs 44 and 45. The ribs, as best shown in Fig. 5, are generally web shaped immediately adjacent the underneath side of the upper spring plate and the opposite faces of the web shaped portion follow individual arcuate paths. The inner face of each of the ribs serves as a positioning flange for the fifth or center spring, which preferably is also of the A.A.R. standard size, and the outer face of each of the ribs serves as an additional spring positioning flange for the outer spring associated with the particular rib. The ribs taper downwardly, finally merging with a medial region of the associated end wall.

The lower spring plate 32 is provided with a pair of upwardly projecting, integral friction housings 48 and 49 that are spaced apart longitudinally and are adapted to straddle the end walls 38 and 39.

The housing 48 is reinforced by a pair of upwardly extending lateral ribs 50 merging at one end with the associated flange portions 34 and terminating at the other end on the side walls 52 of the housing. The remainder of the housing is defined by a bottom wall 53, a top wall 54, and an outer wall 55 that is provided with an inverted keyhole opening 56.

The housing 49 is reinorced by a similar pair of ribs 60 that terminate on the side walls 62. The housing 49 is defined by a botom wall 63, a top wall 64, and an outer wall 65 having a similar inverted keyhole shaped opening 66. The keyhole openings 56 and 66 in the housings 48 and 49, respectively, are adapted to receive a control spring cylinder, as explained hereinafter.

It may be seen that the housings 48 and 49 of the spring seat are spaced apart sufficiently to provide a seat for a fifth or center spring, and thus, in the preferred form, the spring cap 30 and spring seat 32 are adapted to receive therebetween a set of five bolster springs, all of which are preferably of standard size. This further improves the capacity of the spring groups for which the present stabilizing device is adapted. A further and very practical advantage of the novel stabilizing unit resides in the fact that the vast majority of railroads in this country maintain substantial inventories of the A.A.R. standard size springs, whereas it is not economically feasible to maintain similar inventories of the special purpose springs employed in other package units. The maintenance and replacement programs for the package units of the present invention are hence greatly expedited and simplified.

The outer faces of the end walls of the spring cap 30 are each recessed to form pockets for mounting the friction wear plates which comprise one portion of the stabilizing control system. Continuous peripheral shoulder flanges 46 and 47 define the wear plate pockets associated with end walls 38 and 39 and, as best seen in Fig. 3, partially confine the wear plates 68 and 69, respectively. The wear plates which are omitted from the perspective view of Fig. 5 are preferably welded to the end walls.

The remainder of the stabilizing control system consists of a pair of opposed friction assemblies each consisting of a friction shoe 71, a control spring 72 engaging the shoe 71, and a cylinder 73 for housing the control spring. The cylinders 73 are adapted to fit within the inverted keyhole openings 56 and 66 formed in the friction housings and are slidable relative thereto to impose the load of the control springs against the opposed vertical faces of the portions of the side frame columns 24 that define the lower or spring window 27.

The friction shoes 71 are generally block shaped having an inner friction face 75 and an outer face 76 bounded by a top wall 77, bottom wall 78, and side walls 79. All the walls and faces of the shoes are generally rectangular in cross-sectional outline. Adjacent the top of the outer face 76 and medially thereof, each block is provided with an outwardly projecting stub 80 having a downturned end 81. The stub 80 and downturned end are adapted to project through the neck portion of the keyhole opening to cooperate with adjacent surface portions of the outer walls 55 and 65 of the friction housings to permit this portion of the friction system to be maintained in a compressed condition by suitable keying means. In addition, the outer face 76 of the friction shoe is cylindrically recessed, as at 83, to receive the inner end of the control spring. The cylindrical recess 83 is bounded by a pair of upper and lower arcuate recesses of less depth, the upper such recess being designated 84 and the lower one being designated 85.

The spring cylinders 73 are of tubular form having an open inner face bounded by upper and lower peripheral shoulders, designated 87 and 88, respectively, and a partially closed outer wall 90 that provides a seat for the control spring and is adapted to bear against the side frame. One end of each of the shoulders 87 and 88 is provided with a short tapered portion, designated 87′ and 88′, respectively, and in each case this is defined as the leading edge. The outer face 90 of the spring cylinder is provided with a diametral slot 91 that constitutes the only opening in this face and a transversely directed diametral recess 92. The slot 91 and recess 92 cooperate to receive a shim 94, of the type shown in Fig. 7. The shim may be inserted without removing the unit in order to compensate for metal loss on the wear plates and friction shoes.

Finally, the inner face of the outer walls 55 and 65 of each of the friction housings are provided with recessed arcuate portions 96 and 97. The relatively short portion 96 originates adjacent the neck of the keyhole opening and is of gradually diminishing depth. One end of the portion 97 is also of gradually diminishing depth. The outer faces of the outer walls 55 and 65 are cast with reinforcing ribs 98 adapted to compensate for the recessed arcuate portions 97. The reinforcing ribs are correspondingly located and are spread over a slightly larger surface area than are the recesses to insure that the strength of the housing is adequately maintained.

Thus the arcuate recesses of the friction housings are adapted to accommodate the shoulders of the control spring cylinders. These parts are formed with complementary tapered portions adapted to cooperate with each other. The arrangement is such that upon relative rotational movement between a cylinder and a friction housing, the tapered surfaces produce a desirable camming action to cause simultaneous relative longitudinal movement. Since the friction housings are relatively stationary, the longitudinal movement is effective to expand and contract the stabilizing unit and plays an important part in facilitating the installation and removal of he unit. It should be noted that the control spring opposes relative longitudinal movement in one direction and assists longitudinal movement in the opposite direction. Therefore, in the case where the control spring opposes longitudinal movement, namely when it is desired to compress the unit, the tapered surfaces produce an active camming action that assists in overcoming the control spring's resistance to compression. In the case, however when the unit is to be expanded, the tapered surfaces are more properly described as passive. As a result of relative rotational movement in the last mentioned case, the tapered surfaces permit the control spring to expand the unit, and this expansion is gradual in nature, as determined by the slopes of the tapered surfaces. This feature will become more clear as the description proceeds.

In assembling the various parts of the present unit, the spring cylinders 73 are first inserted through the keyhole openings of the friction housings 48 and 49 from inside to outside. The cylinder is rotated relative to the friction housing, as shown in Fig. 7, so that the ears 87 and 88 are adapted to contact the innermost surface portions of the outer walls 55 and 65 of the friction housings. That is, the cylinder is inserted so that the ears do not nest within the recesses in the friction housing. The control springs 72 are then inserted in the cylinders and, finally, the friction blocks 71 are mounted within the friction housings. The arrangement is such that the inner end of the control springs 72 extends into the cylindrical recess 83 formed in the outer face 76 of the friction shoe, and the ears 87 and 88 of the control cylinder are adapted to nest within the peripheral recesses 84 and 85, respectively, which adjoin the cylindrical recess 83. The recesses 84 and 85 are somewhat longer than the ears 87 and 88 and accommodate all necessary movements of the ears. The control cylinder is thus able to rotate relative to the friction block.

The inherent arrangement of the parts of the friction system makes it impossible to assemble them incorrectly. For instance, if the cylinder 73 is disposed relative to the friction housing so that the ear 88 nests within the recess 97, it will be impossible to properly mount the friction shoe 71. The ear 87 in this position extends into the neck portion of the inverted keyhole opening and renders the neck incapable of receiving the stub 80 and downturned end 81 of the friction shoe.

In order to facilitate the introduction of the upper spring plate between the spaced friction shoes housed within the lower spring plate, it is contemplated that the friction shoes may be forced outwardly from the position in which they are shown in Fig. 3 to permit the downturned end 81 of the friction block stub 80 to project beyond the outermost surface of the outer wall 55 of the friction housing 48. Suitable keying means (not shown) may then be inserted between the downturned end 81 and the outer wall 55 to maintain the parts in this compressed condition. After both of the opposed friction assemblies have been similarly compressed, there is sufficient clearance to permit the spaced end walls of the top member to be easily inserted between the friction blocks. The keying means may then be removed to permit the control springs to urge the friction blocks against their corresponding wear plates carried by the end walls of the top plate, and this force is sufficient to maintain the package in its assembled condition. It is contemplated that the package of the present invention may be crated and packed for shipment when the parts are in the assembled condition previously described.

It will be recalled that when the parts are in the assembled condition, the ears 87 and 88 of the spring cylinder 73 are in the rotated position and are in contact with the innermost surface portions of the walls 55 and 65. Hence the package is in a compressed condition and the arrangement is such that the spacing between the opposite end walls 90 of the control spring cylinders 73 is less than the distance between the opposed vertical faces of the side frame columns 24. Thus the package may readily be inserted within the bolster spring window 27 without having to further compress it. Prior to inserting the package, the bolster 29 is jacked up to provide sufficient head room for the bolster springs of the package, and after the package has been correctly positioned in accordance with the location of the projections 36 on the top and bottom spring plates, the bolster is lowered into position.

Before placing the truck in operation, it is necessary to fully release the package unit. This is accomplished, as shown in Fig. 10, by employing a suitable lever 99 having an end portion 100 adapted to fit within the slot 91 formed in the outer wall 90 of the spring cylinder. The end portion 100 is inserted into the slot 91 and the cylinder is rotated counterclockwise, as viewed in Fig. 10, until the upper ear 87 is in register with the neck portion of the keyhole opening and the lower ear 88 is in register with the arcuate recess 97 formed in the outer wall of the friction housing. The parts are then in the position shown in Figs. 2 and 3 with the end walls 90 of the control spring cylinders engaging the vertical faces of the side frame columns 24. The ears 87 and 88, being in register with the recesses of the outer walls of the friction housings, are no longer in abutting contact with any portion of the friction housings. A phantom line 101 is shown in each of Figs. 2 and 3 and it indicates the expanded position of the cylinder if its movement were not blocked by the side frame columns. Thus it may be seen that the control springs are precompressed to a certain extent and the degree of precompression determines the load which they will impose upon the friction faces.

From the above it will be seen that when the stabilizing unit is in service, the control springs are loaded against the side frames and the strains associated with the stabilizing system are completely removed from the spring seat. Also, there is no relative sliding movement between the side frame and the spring cylinders.

Figure 2:
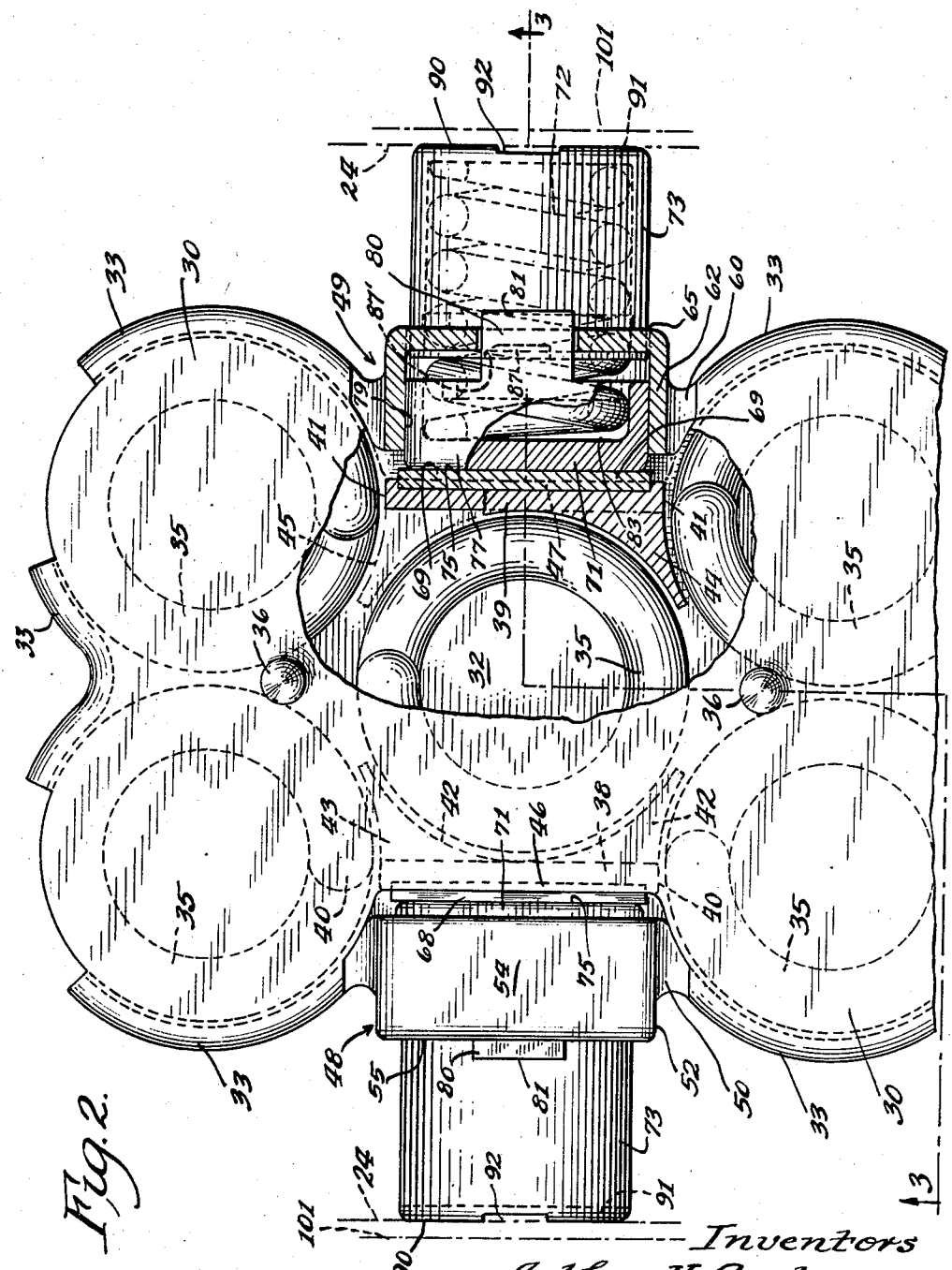
Fig. 2 is a plan view of the preferred form of the ride stabilizing unit of the present invention with parts broken away.

The shim 94, which is shown in Fig. 7, consists of a circular disc having a pair of diametral ridges 102 and 103. The ridge 103 includes a projecting portion 104 and an intermediate tapered portion 105, and at the opposite end terminates short of the periphery of the disc 94, It is well known that the stabilizing action between the friction shoes and the wear plates will gradually and continually cause the engaged metal parts to wear away. Ultimately, this loss of metal in the friction system reduces the stabilizing force exerted by the control springs by decreasing their original state of precompression. In the preferred form it is possible to determine the amount of metal loss on the friction faces by measuring the distance between the outer edges of the downturned ends 81 of the friction shoes. As shown in Figs. 1, 2, and 3, access may be had to these surfaces without removing the unit from its installed position within the spring window 27. Any suitable calipering device may be employed for making the measurements.

A contributing factor in the loss of stabilizing action resides in the fact that the resiliency characteristics of the control springs themselves deteriorate to a certain extent over a long period of use, and for these reasons it becomes desirable to restore the stabilizing forces to their original values. According to the present invention, this can be accomplished without removing the package. The control springs are recompressed to restore them to their original load value by inserting the shim 94 between the end wall 90 of the control spring cylinder and the vertical face of the side frame column, thereby displacing the control spring cylinder inwardly. In installing the shim, the outer projection 104 is inserted into the slot 91 which, when the package is in operating position, is horizontally inclined (see Figs. 3 and 4). Any suitable tool may then be used to force the shim inwardly until the ridge 102 engages the transverse recess 92 of end wall 90. The tapered portion 105 creates a wedging action that facilitates the insertion of the shim.

Referring again to Figs. 2 and 3, it may be seen that the cooperating friction surfaces lie in parallel vertical planes and hence the stabilizing force is constant for both compression and release movements of the bolster springs and is also independent of the magnitude of the loads imposed on the bolster. The friction shoes 71 are provided with flat faces and the arrangement is such that the shoes are axially loaded by the control springs. The axial loading of the flat friction shoes is an important feature of the present device in that it eliminates friction shoe sticking and the consequent bombarding of the wear plates by the friction shoes. The flat surfaces of the shoes permit any necessary relative lateral movement between the shoes and the wear plates.

Additionally, it may be seen that the control springs 72 react between the vertical faces of the side frame columns and the end walls of the spring cap 30 and therefore oppose any longitudinal shifting of the bolster relative to the truck. Because the stabilizing units of the preferred form are biased against the side frame columns, they are believed to be particularly efficient and effective in the overcoming of longitudinal shifting of the package and hence of the bolster.

Thus it may be seen that the stabilizing unit of the preferred form controls vertical, lateral, and longitudinal movements of the bolster in a simple and efficient manner, and in accommodating this three-way control is loaded against the side frame columns to relieve one of the package members, namely the spring seat 32, of any strains associated with the stabilizing function.

If it is desired to remove the unit from its mounting within the spring window 27, the removal is accomplished by means of the lever bar 99, previously referred to, which is inserted in the slot 91 provided in the end wall 90 of the control spring cylinder 73. The lever bar is employed to rotate the cylinder, and as the cylinder rotates, the leading edge of ear 87, which is tapered, cams over the oppositely tapered edge of recess 96 formed in the end wall 55 of the friction housing 48, and the leading edge of ear 88 is also similarly tapered to cam over the corresponding surface portion defining one end of recess 97 formed in the wall 55.

The wedging action, which is afforded by the cooperating tapered portions, reduces the effort required to rotate the cylinder and permits the stabilizing unit to be returned to its assembled condition, wherein the ears 87 and 88 abut against the innermost surface portions of the wall 55.

If the unit being removed has been modified by the insertion of a shim to recompress the control spring, it is necessary to first remove the shim before the cylinder 73 can be rotated. For this reason, the ridge 103 on the shim 94 at one end terminates short of the periphery of the shim to facilitate the insertion of the leading edge of a wedge. The wedge may then be driven inwardly to force the shim out.

In marketing the stabilizing unit of the present invention, it is contemplated that the parts may be assembled without the bolster springs and shipped to the users who will then supply the springs from their own inventories and build up the device accordingly. The stabilizing unit of the present invention is readily adapted to such a purpose.

A modified form of the present invention is shown in Figs. 11, 12, and 13, and in this form the general arrangement is substantially similar to that of the preferred form in that the stabilizing system is loaded against the vertical faces of the side frame columns and in that the unit is capable of accommodating five bolster springs of the A.A.R. standard recommended practice. The modifications of this form are concerned principally with the method of mounting the stabilizing unit within the bolster spring window 27 defined by the lower regions of the side frame columns 24. The modified package unit is adapted to be installed in the same location as the preferred form and to that end is also equipped with positioning projections 36 at the top and bottom which cooperate with suitable openings provided in the bolster and the spring plank (not shown), if used.

In the modified form, the spring cap is shown (see Fig. 11) as a two-piece member, designated 30A and 30B, but it is contemplated that the modified form may also be made with an integral spring cap, such as is shown at 30 in Fig. 2. With the above exceptions, the spring cap of the modified form may be identical in all respects with the spring cap of the preferred form and the corresponding parts are designated by identical reference characters. It is not believed necessary to redescribe the organization and function of the portions which are identical.

In the two-piece spring cap, the parts 30A and 30B are complementary in that 30A is formed with a keyhole shaped groove 110 on one side and a similarly shaped tongue 111 on the other side, whereas 30B is formed with a keyhole shaped tongue 113 and a similarly shaped groove 114. The tongue 113 is adapted to be engaged within the groove 110, and the tongue 111 is adapted to be engaged within the groove 114 to interlock the parts 30A and 30B and permit them to act as a one-piece spring cap. In addition, the tongue and groove arrangement permits the parts 30A and 30B to pivot relative to each other without becoming disengaged.

The spring seat 32 is of one-piece construction, as in the case of the preferred form, and is generally of identical construction, the similar parts being designated by similar reference characters. The friction housings 48A and 49A, however, vary in regard to certain details. The general arrangement and location of the friction housings is, as shown in Fig. 12, substantially identical with the corresponding parts of the preferred form with the exception that the outer walls 55A and 65A are not provided with recesses for accommodating the projecting ears of the control spring cylinder. In addition, the friction shoes 71A and control spring cylinders 73A are somewhat modified in order to accommodate a different keying arrangement. It is intended, however, that the keying arrangement of the modified form may be employed with equal facility in connection with the stabilizing system of the preferred form, and this will become more apparent as the description proceeds.

The friction shoes 71A are provided with a similar control spring seat recess 83, but this recess is bounded by a single lower arcuate recess 97A of less depth and a pair of laterally displaced upper arcuate recesses. The outwardly projecting stub 80A of the friction shoe is adapted to project through the neck portion of the keyhole slot 66 and is formed with a transverse keying slot 81A.

The control spring cylinder of the modified form is also of cylindrical shape and is provided with a lower ear 88A and a pair of spaced upper ears 87A, as best shown in Fig. 13. The end wall 90 of the control spring cylinder includes a diametral slot 91 and cooperating transverse recess 92, as in the case of the preferred form. On the top side and adjacent its inner end, the cylindrical wall of the cylinder 73A is relieved, as at 116, to accommodate the stub portion 80A of the friction shoe. In this modified arrangement, the stub portion 80A, which completely surrounds the keyway 81A, is necessarily thicker than the corresponding stub portion 80, illustrated in connection with the preferred form, and for that reason the spring cylinder is relieved, as at 116, to provide head room for the stub portion 80A.

The parts of the modified form of stabilizing unit are assembled in the same order and manner as in the case of the preferred form with certain obvious variations. The control spring cylinder 73A is first inserted through the friction housings from inside to outside and is disposed with the lower ear 88A facing downwardly so that the spaced upper ears 87A are located on opposite sides of the vertical center line of the keyhole opening of the friction housings. The control spring 72 is then positioned within the cylinder, and finally the friction block is mounted within the housing so that the projecting stub portion 80A extends through the neck region of the keyhole slot. This assembly may then be compressed until the keyway 81A of the friction shoe clears the outermost surface of the outer wall 65A of the friction housing and a suitable keying element (not shown) is inserted within the keyway 81A to maintain the parts in the compressed condition. Both of the opposed friction assemblies are simliarly assembled, compressed, and keyed. The spring cap, whether of one-piece or two-piece construction, may then be lowered in place between the opposed friction shoes and the device is now ready for crating and shipping.

If the spring cap is of one-piece construction, the keying elements may be removed to permit the shoes to grab the opposed end walls of the spring cap and the assembly is preferably shipped in this condition. If the spring cap is of two-piece construction, the keying elements are preferably retained and the assembly is shipped while in its key compressed condition. The phantom lines 101A, shown in Figs. 11 and 12, illustrate the fully expanded size of the modified form of package unit and it may be seen that this size exceeds the distance between the side frame columns between which the unit is to be installed. Therefore, in installing this modified form of ride stabilizing unit, it is necessary to compress the stabilizing system sufficiently to reduce its overall width beneath the intercolumnar distance. This is usually accomplished by partially engaging the end wall 90 of one of the spring cylinders against its associated side frame column and then employing a wedge bar to compress the stabilizing system and force it into the bolster spring window.

There is, admittedly, a certain degree of difficulty encountered in carrying out such an operation and the two-piece spring cap arrangement is particularly useful in reducing the required effort. Because of the unique tongue and groove relationship, the parts 30A and 30B of the two-piece spring cap will each tend to pivot when their respective depending end walls are subjected to the wedging action heretofore described. Thus the wear plates carried by the end walls of the parts 30A and 30B pivot away from the friction faces of the friction shoes and the control springs 72 are afforded more room for movement. This markedly reduces the effort required to compress the unit preparatory to installation. As the bolster is lowered into place and the full weight of the car is imposed upon the package unit, the two-piece spring plate is forced into its normal position, wherein the parts 30A and 30B lie in a common horizontal plane.

It should be apparent that the modified form of ride stabilizing unit has all the operating advantages of the preferred form in that it also provides three-way control of the bolster movements and in that the stabilizing system employs axially loaded, flat-faced friction shoes that exert a constant stabilizing force on both the compression and release of the bolster springs. The method of counteracting longitudinal movements of the bolster is again an inherent function of the arrangement and hence is carried out in an extremely effective manner. Furthermore, the control spring cylinders slide freely relative to the friction housings carired by the spring seat and are loaded solely against the side frame columns, thereby relieving the spring seat of any strains associated with the stabilizing system. The modified form is also adapted to be compensated for metal losses by suitably shimming up the control springs to restore them to their initial state of high compression. The major difference from the preferred form resides in the arrangement for installing and removing the unit in the bolster spring window.

The modified form of Figs. 11, 12, and 13 may be shipped as parts to which the user adds the bolster springs to complete the unit.

In Fig. 14 there is a fragmentary showing of another modified form of the present invention and this particular unit has special advantages from a manufacturing standpoint since it employs a minimum of working parts. In the fragmentary view the spring cap is designated 30 as it may be identical in all material respects to the spring cap disclosed in connection with the preferred form. Alternatively, however, a two-piece spring cap may be employed and this is purely a matter of choice. The spring seat in this arrangement is considerably different than that of the two previous units and accordingly is designated 32B. The friction housing 48B shown in Fig.14 is of stepped construction, and the innermost portion defined by the top and bottom walls 120 and 121, respectively, is the widest and is adapted to receive a friction shoe of the type described in connection with the modified forms of Figs. 11, 12, and 13. The outer portion defined by the top and bottom walls 123 and 124, respectively, and end wall 90B is somewhat narrower than the inner portion and is adapted to house and provide a seat for a control spring 72. Thus it may be seen that the control spring housing of this form is integral with the spring seat and, of course, can not move relative thereto. The top wall 123 of the outer portion of the friction housing has a medially raised portion, as indicated by the vertical wall 125 and horizontal wall 126, which merges with the top wall 120 of the inner portion. This raised portion is adapted to accommodate the stub 80A of the friction shoe and has its side faces 127 formed with aligned slots 128 to provide free access for a keying element that is adapted to be inserted in the keyway 81A of the friction shoe and retain the friction assembly in a compressed condition. The portions of the top wall 123 that flank the friction shoe stub housing portion are joined to the top wall 120 by vertical walls 128. This general keying arrangement is substantially the same as in the case of the modified form of Figs. 11, 12, and 13 and is deemed to require no further elaboration.

The end wall 90B, which acts as a seat for the control spring, is provided with a horizontally disposed recess 91B, and this recess is adapted to receive a compression member to transfer the strains created by the stabilizing system from the spring seat member to the side frame column, which is indicated in phantom at 24 in Fig. 14. The compression member 129 is shown in Fig. 14A and, as indicated, is of a tapered, wedge shaped construction and preferably is formed of either malleable iron or mild steel. This unit is assembled in the same manner as the previous ones by compressing the friction shoes within the friction housings and keying them in their compressed condition. The top member may then easily be lowered into place and the keying elements removed.

It will be noted that the stabilizing unit of the embodiment of Fig. 14 is of less width, measuring between the opposed outer walls 90B, than the inter-columnar spacing of the side frame, and hence it is easily mounted in place within the bolster spring window. There will be a small clearance space, as indicated at 130, between each of the side frame columns and their associated wall 90B, and the wedge 129 is adapted to be driven therebetween to bridge this space. After the wedge is driven into place, the narrow end is preferably turned inwardly, as shown at 131 in Fig. 14A, to prevent it from becoming disengaged during use. Thus, through the medium of the wedge, the stabilizing forces generated by the control springs are loaded against the side frame column and this relieves the spring seat, as previously described. The wedge cooperates with the lower spring plate and effectively locks it between the side frame columns to positively prevent longitudinal shifting. In addition, the wedge and control springs cooperate to oppose any tendency of the bolster to shift longitudinally with respect to the truck.

The modified form illustrated in Fig. 14 is characterized by the same operating functions previously enumerated with respect to the earlier forms, and this is sufficiently apparent to obviate the necessity of again particularizing these functions.

Fig. 15 is a similar fragmentary view of still another modified form of the present invention, and in this form also the spring cap 30 is identical with the spring cap described in connection with the preferred form. The spring seat 32 is of the same general arrangement having a pair of opposed friction housings 48, and in this instance the peripheral wall portions 130 that define the rear of the friction shoe housing and surround the space allotted to the control springs are provided with an outwardly directed, circumferential lip 132 that is adapted to telescope within the outwardly offset shoulder flanges 133 carried by the control spring cylinder 73C. The lip 132 and flange 133 are each interrupted in a similar fashion to accommodate the stub 80A of the friction shoe. Medially of its top wall, the substantially cylindrical control spring cylinder is interrupted by an upwardly directed, vertical end wall 134, a pair of vertical side walls 135, and an inwardly directed, horizontal wall 136 that partially house the stub 80A of the friction shoe. The side walls 135 are slotted, as at 137, to cooperate with the keyway 81A and keying element 138 to retain the parts in a compressed condition. This has been described fully with reference to the previous embodiments. The control spring thus acts between the wall 90C of the cylinder and a recessed region 83 in the outer face of the friction shoe.

As shown in Fig. 15, this embodiment must be keyed in order to maintain it in assembled relationship, the reason for this being that the control spring cylinder is mounted outwardly of the friction housing and has no projecting ears to engage portions of the friction housing and limit its outward movement. Therefore, the keys are used not only for assembling the parts and permitting the spring cap to be easily lowered into place, but also to maintain the unit sufficiently compressed to permit it to be readily inserted within the bolster spring window. The outer wall 90C of the control spring cylinder is substantially identical with the outer walls 90 and 90A of the first two embodiments and includes a diametral slot 91C and a cooperating transverse diametral recess 92C of less depth. After the unit is installed and the keying element has been removed, the control spring expands to engage the outer wall 90C of the spring cylinder against the side frame column in a now familiar manner and to engage the friction block against the wear plate and the operation of the unit is in all respects identical with those previously described. It is also possible to shim up the stabilizing system of the unit of Fig. 15 if desired. Again the amount of metal loss may be measured without disassembling the unit and the slots 137 provide ready access for this purpose.

Finally, in Fig. 16 is shown still another embodiment and in this form the relative locations of the friction housings and end walls are reversed. The construction and arrangement of the spring plates and stabilizing system are somewhat different; however, the basic principle of side frame loading of the control springs is unchanged. Fig. 16 is a fragmentary illustration as it is not deemed necessary to elaborate on the relatively minor and insignificant constructional details.

The spring cap 30D is cast with integral back-to-back friction housings that open away from each other. Only one such housing 48D is shown and it is supported from the spring cap 30D by a pair of rib portions 140 and 141. The housing is of stepped construction and may roughly be subdivided into two sections, the control spring section and the friction shoe section. The control spring section is defined by a rear wall or spring seat 143 that is common to both friction housings and a cylindrical wall 144. The friction shoe section is substantially rectangular and is defined by top, bottom, and side walls 146, 147, and 148, respectively. The two sections are joined by an outwardly directed peripheral flange 149.

The control spring may be of conventional form and is simply inserted in the spring housing with one end bearing against the spring seat 143. The friction shoe 71D is generally block shaped and fits nicely within the rectangular friction shoe housing. The inner face 76D of the friction shoe is cylindrically recessed, as at 150, and the control spring 72 fits within the recess and urges the friction shoe outwardly.

The spring seat 32D of the present embodiment is provided with a pair of spaced upwardly extending parallel end walls that are adapted to straddle the friction housings and cooperate with the friction shoes.

Only end wall 38D is shown in the fragmentary view of Fig. 16 and it receives on its inner face a wear plate 68D that is formed at its upper end with an outwardly directed lip 151. The lip is adapted to rest upon the top horizontal surface 152 of end wall 38D. In addition, end wall 38D is formed with a pair of vertical guide shoulders 153 along the sides of its inner face, and these shoulders assist to locate and maintain the wear plate 68D on the end wall.

The end wall 38D is apertured approximately centrally thereof, as shown at 155, and the wear plate 68D is formed with a similarly located aperture 156 that is tapered to receive the head end of a bolt 157. The head 158 of the bolt is countersunk and defines with the adjacent surface portions of the wear plate 68D a substantially smooth friction surface.

The bolt 157 is provided with a continuously threaded shaft 160 on which are mounted first and second hexagonal nuts, designated 161 and 162, respectively, and a pressure plate 164. The nut 161 cooperates with the bolt 157 to secure the wear plate 68D in place, and the nut 162 secures the pressure plate 164 in any desired position.

As shown in Fig. 16, the pressure plate 164 is provided with substantially flat and smooth outer face 165 that is adapted to abut against the vertical face of the side frame column 24 to transfer strains created by the stabilizing system from the end wall 38D of the spring seat 32D to the side frame column 24. Thus the spring seat 32D is relieved of any strains associated with the stabilizing system. In addition, the spring cap is arranged so that the strains associated with the opposed control springs substantially cancel each other. This arises from the fact that the wall 143 is common to each friction housing and serves as a spring seat for the opposed control springs.

In mounting the stabilizing unit of Fig. 16 within the bolster spring window 27, it is merely necessary to first back off both the hexagonal nut 162 and the pressure plate 164 until a sufficient clearance has been provided, insert the unit, and return the pressure plate and its locking nut until proper contact is established with the vertical face of the side frame column 24.

Due to the arrangement of the friction system, the embodiment of Fig. 16 accommodates only four bolster springs, whereas the previous arrangements accommodated five bolster springs. The springs, however, may be of A.A.R. standard recommended practice and this represents a considerable advantage over units now in service.

In the device of Fig. 16, side frame loading is employed and the inherent advantage of such a system which permits it to directly oppose longitudinal shifting of both the bolster and the package is again present. The friction shoes are axially loaded and have flat friction faces to accommodate both vertical and lateral movements of the bolster. In addition, the cooperating friction surfaces lie in vertical planes and hence the stabilizing force is constant for all loads. The use of side frame loading permits the spring seat and spring cap construction to be simplified since the strains due to the stabilizing system are markedly reduced. It will be noted that the nesting of one of the spring plate members within the other is entirely avoided in the embodiment of Fig. 16 and therefore the unit is not subject to fracture by pronounced relative lateral movement between the spring plate members. This last-mentioned figure is true of all of the disclosed forms of the invention.

From the description and drawings, it will be seen that the objects of the invention have been accomplished and a variety of constructional forms embodying the concepts of the invention have been disclosed.

We claim:

1. The combination with a conventional truck having a bolster supported between spaced side frame columns; of a ride-stabilizing package unit for supporting said bolster and comprising a spring set interposed between upper and lower spring plates, one of said plates having a set of vertically projecting, oppositely horizontally directed, flat-faced, rigid friction wall members, and the other of said plates having a set of oppositely horizontally directed, aligned friction housing members, said sets being received one within the other in opposing cooperating relation in a direction longitudinally of said truck to define inner and outer sets, with the members of the outer set being discrete and overlapping the members of the inner set for abutting engagement therewith only upon relative movement therebetween in directions longitudinally of said truck, said housing members supporting friction means having flat friction faces biased into engagement with said wall members such that relative movement between the plates of said unit in directions transverse to the longitudinal direction of said truck is resisted substantially only by frictional sliding action between said wall members and said friction faces, and means for loading the members of said outer set against the side frame columns to reduce strains on one of said plates due to forces arising during operation of the unit.

2. The combination with a conventional truck having a bolster supported between spaced side frame columns; of a ride-stabilizing package unit for supporting said bolster and comprising first resilient means interposed between upper and lower spring plates, one of said plates having a set of vertically projecting, oppositely horizontally directed, flat-faced, rigid friction wall members, and the other of said plates having a set of oppositely horizontally directed, aligned friction housing members, said sets being received one within the other in opposing cooperating relation in a direction longitudinally of said truck, with one set interposed between the other to define inner and outer sets with the members of the outer set being discrete and overlapping the members of the inner set for abutting engagement therewith only upon relative movement therebetween in directions longitudinally of said truck, said housing members supporting friction means including second resilient means urging flat friction faces into engagement with said walls such that relative movement between the plates of said unit in directions transverse to the longitudinal direction of said truck is resisted substantially only by frictional sliding action between said wall members and said friction faces, and means for loading the members of said outer set against the side frame columns to reduce strains on one of said plates due to forces arising during operation of the unit.

3. The combination with a conventional truck having a bolster supported between spaced side frame columns; of a ride-stabilizing package unit for supporting said bolster and comprising upper and lower spring plates, one of said plates carrying spaced apart, vertically projecting, oppositely horizontally directed friction walls, with each wall rigidly connected to said one plate by means including arcuate reinforcing webs such that said webs substantially define with said one plate a flanged central spring seat, and the other of said plates having oppositely horizontally directed, aligned friction housing members spaced apart in a direction longitudinally of said truck to receive said walls therebetween in opposing cooperating relation therewith, friction means carried by said housings for engagement with said walls, and a set of full-sized bolster-supporting coil springs including corner springs and a center spring interposed between said upper and lower plates, and means for loading said friction means against the side frame columns to reduce strains on one of said plates due to forces arising during operation of the unit.

4. The combination with a conventional truck having a bolster supported between spaced side frame columns; of a ride-stabilizing package unit for supporting said bolster and comprising resilient means interposed between spaced upper and lower plates, said upper plate having rigid, vertically projecting friction walls facing away from each other and aligned in a direction longitudinally of said truck, said lower plate having rigid, oppositely horizontally directed friction housings spaced apart in a direction longitudinally of said truck, to receive said friction walls therebetween in opposing cooperating relation therewith, friction means mounted in said housings and reacting between said housings and said friction walls, and compression means reacting between said friction housings and said side frame columns to relieve the lower spring plate of strains associated with the stabilizing system.

5. The combination with a conventional truck having a bolster supported between spaced side frame columns; of a ride-stabilizing package unit for supporting said bolster and comprising resilient means interposed between spaced upper and lower plates, said upper plate having rigid, vertically projecting friction walls facing away from each other and aligned in a direction longitudinally of said truck, said lower plate having rigid, oppositely horizontally directed friction housings spaced apart in a direction longitudinally of said truck, to receive said friction walls therebetween in opposing cooperating relation therewith, friction means mounted in said housings and reacting between longitudinally spaced apart, vertical walls of said housings and said friction walls, said last-mentioned vertical walls having recesses in their outer portions extending transversely of the longitudinal direction of said truck, and compression means in said recesses and projecting therebeyond in a direction longitudinal of said truck to react between said friction walls and said side frame columns and relieve the lower spring plate of strains associated with the stabilizing system.

6. The combination with a conventional truck having a bolster supported between spaced side frame columns; of a ride-stabilizing package unit for supporting said bolster and comprising resilient means interposed between spaced upper and lower plates, said upper plate having rigid, vertically projecting friction walls facing away from each other and aligned in a direction longitudinally of said truck, said lower plate having rigid, oppositely horizontally directed friction housings spaced apart in a direction longitudinally of said truck, to receive said friction walls therebetween in opposing cooperating relation therewith, friction means mounted in each of said housings and including second resilient means reacting between longitudinally spaced apart, vertical walls of said housings and urging friction shoe means into engagement with said friction walls, said last-mentioned vertical walls having recesses in their outer portions extending transversely of the longitudinal direction of said truck, and compression means in said recesses and projecting therebeyond in a direction longitudinal of said truck to react between said friction walls and said side frame columns and relieve the lower spring plate of strains associated with the stabilizing system.

7. The combination with a conventional truck having a bolster supported between spaced side frame columns; of a ride-stabilizing package unit for supporting said bolster and comprising a spring set interposed between spaced upper and lower spring plates, said upper plate having rigid, vertically downwardly projecting, oppositely horizontally directed, flat-faced friction walls facing away from each other in a direction longitudinally of said truck, said lower plate having a set of rigid friction housings opening toward each other and spaced apart in a direction longitudinally of said truck to receive said friction walls therebetween in opposing cooperating relation therewith, with said housings being discrete and overlapping the friction walls of the upper plate for abutting engagement therewith only upon relative movement therebetween in directions longitudinally of said truck, and friction means supported in said housings and having flat friction faces biased into flush engagement with said friction walls such that relative movement between the plates of said unit in directions transverse to the longitudinal direction of said truck is resisted substantially only by frictional sliding action between said friction walls and said friction faces, and means for loading said friction means against the side frame columns to relieve the lower spring plate of strains arising during operation of the unit.

8. The combination with a conventional truck having a bolster supported between side frame columns; of a ride-stabilizing package unit for supporting said bolster and comprising resilient means interposed between upper and lower spring plates, one of said plates having a rigid set of vertically projecting, generally oppositely facing friction wall members and the other of said plates having a set of generally oppositely facing friction housing members, with the set of members of said upper plate being received between and in opposing cooperating relation with the members of said lower plate, friction means in said housing members and including friction blocks biased into engagement with said walls, and means for loading the said members of the lower plate against the side frame columns to reduce strains on said lower plate.

9. The combination with a conventional truck having a bolster supported between spaced side frame columns; of a ride-stabilizing package unit for supporting said bolster and comprising coil spring means interposed between upper and lower spring plates, one of said plates having a rigid set of vertically projecting, generally oppositely facing friction wall members and the other of said plates having a set of generally oppositely facing friction housing members, with the set of members of said upper plate being received between and in opposing cooperating relation with the members of said lower plate, friction means in each housing member and including a friction block and resilient means reacting against the housing to bias the block into engagement with the adjacent friction wall, and means for loading the said members of the lower plate against the side frame columns to reduce strains on said lower plate.

References Cited in the file of this patent

UNITED STATES PATENTS

| | | |
|---|---|---|
| 1,695,085 | Cardwell | Dec. 11, 1928 |
| 2,141,767 | Camp | Dec. 27, 1938 |
| 2,295,548 | Cottrell | Sept. 15, 1942 |
| 2,295,556 | Flesch | Sept. 15, 1942 |
| 2,356,742 | Bachman | Aug. 29, 1944 |
| 2,367,510 | Light | Jan. 16, 1945 |
| 2,395,967 | Haseltine | Mar. 5, 1946 |
| 2,561,308 | Cottrell | July 17, 1951 |
| 2,613,075 | Barrett | Oct. 7, 1952 |
| 2,667,844 | Ramos | Feb. 2, 1954 |
| 2,670,949 | Dentler | Mar. 2, 1954 |
| 2,687,295 | Tucker | Aug. 24, 1954 |
| 2,687,296 | Tucker | Aug. 24, 1954 |